United States Patent [19]
Pan

[11] Patent Number: 5,754,721
[45] Date of Patent: May 19, 1998

[54] FIBEROPTIC CONNECTOR

[75] Inventor: Jing-Jong Pan, Milpitas, Calif.

[73] Assignee: E-Tek Dynamics, Inc., San Jose, Calif.

[21] Appl. No.: 708,660

[22] Filed: Sep. 5, 1996

[51] Int. Cl.$^6$ ..................................... G02B 6/38
[52] U.S. Cl. .................. 385/60; 385/72; 385/78; 385/88; 385/92
[58] Field of Search ............... 385/92–94, 96, 385/98, 56, 60, 78, 72, 88

[56] References Cited

U.S. PATENT DOCUMENTS

| | | | |
|---|---|---|---|
| 4,615,581 | 10/1986 | Morimoto | 385/60 |
| 4,805,976 | 2/1989 | Wilkening et al. | 385/85 |
| 4,877,303 | 10/1989 | Caldwell et al. | 385/66 |
| 5,151,961 | 9/1992 | Hvezda et al. | 385/92 |
| 5,315,680 | 5/1994 | Musk et al. | 385/92 |
| 5,359,683 | 10/1994 | Pan | 385/33 |
| 5,363,461 | 11/1994 | Bergmann | 385/78 |

FOREIGN PATENT DOCUMENTS 1-31106   2/1989   Japan ........................ 385/93

*Primary Examiner*—Rodney B. Bovernick
*Assistant Examiner*—Hemang Sanghavi
*Attorney, Agent, or Firm*—Townsend and Townsend and Crew LLP

[57] ABSTRACT

The present invention provides for a fiberoptic connector device which has low back reflection with little increase in insertion loss. The connector device includes an end section of the optical fiber, a ferrule holding the end section, an optical fiber section in the ferrule, and a housing holding the ferrule. The end of the optical fiber terminates in the ferrule and the optical fiber section is coaxially aligned with the end section in the ferrule between the end of the optical fiber and an end of the ferrule. The optical fiber section has one end in close proximity to the end of the optical fiber and its other end terminates with the end of the ferrule. The end of the optical fiber is slanted and covered with antireflection material. The proximate end of the optical fiber section is slanted reciprocally and also covered with antireflection material.

8 Claims, 3 Drawing Sheets

5,754,721

FIBEROPTIC CONNECTOR

BACKGROUND OF THE INVENTION

The present invention is related to fiberoptic devices and, more particularly, to connectors, adapters, and terminators for optical fibers.

In fiberoptic networks, light signals are sent over optical fibers. Connectors, adapters and terminators are devices by which optical fibers are removably connected together, or by which an optical fiber is removably connected to an optical device, such as a laser diode. A fiberoptic connector holds an end of an optical fiber and is, generally speaking, the male portion of a connection. An adaptor forms the female portion of the connection and may hold the end of an optical fiber. A terminator forms the male portion of the connection and is sometimes fixed to an fiberoptic device (having the female portion of the connection) so that the terminator can optically connect its optical fiber to the device.

There are many different types of connectors, adapters and terminators. Besides the mechanical connection by which a connector and adaptor, or a connector and a terminator mate with each other, the different types specify the shape of the end of an optical fiber so that the maximum optical signal is transmitted through the connection, or, conversely, the minimum optical signal is reflected. Modern connectors, adapters and terminators have very good performance with high transmittance and low reflectance. Typical return losses are −35 dB or better.

Nonetheless, for some fiberoptic devices connected to the other end of the optical fiber, even very small amounts of reflected light are not acceptable. For example, a laser diode is highly susceptible to light reflected back through its output fiber. A very small amount of reflected light causes the laser diode output to wander over wavelength and power, a highly undesirable result in most applications. For example, in WDM (Wavelength Division Multiplexing) systems the wavelength spacing between communication channels is narrow so that a tightly controlled laser output is highly desirable.

In some cases, prior art connector devices have used refractive index-matching fluids, such as glycerine, to reduce back reflection. However, besides the inconvenience of working with fluids, the problem of whether the fluid maintains its refractive index over time remains.

The present invention presents solves or substantially mitigates these problem with an inexpensive and simple improvement for connectors, adapters and terminators, which significantly lowers back reflection without affecting the optical performance of the device.

SUMMARY OF THE INVENTION

The present invention provides for a connector device for an optical fiber comprising an end section of the optical fiber, a ferrule holding the end section such that an end of the optical fiber terminates in the ferrule, an optical fiber section coaxially aligned with the end section in the ferrule between the end of the optical fiber and an end of the ferrule, and a housing holding the ferrule. A first end of the optical fiber section is in close proximity to the end of the optical fiber and a second end terminates with the end of the ferrule. The connector device has low back reflection with little, if any, increase in insertion loss.

DETAILED DESCRIPTION OF SPECIFIC EMBODIMENTS

Figure 1:
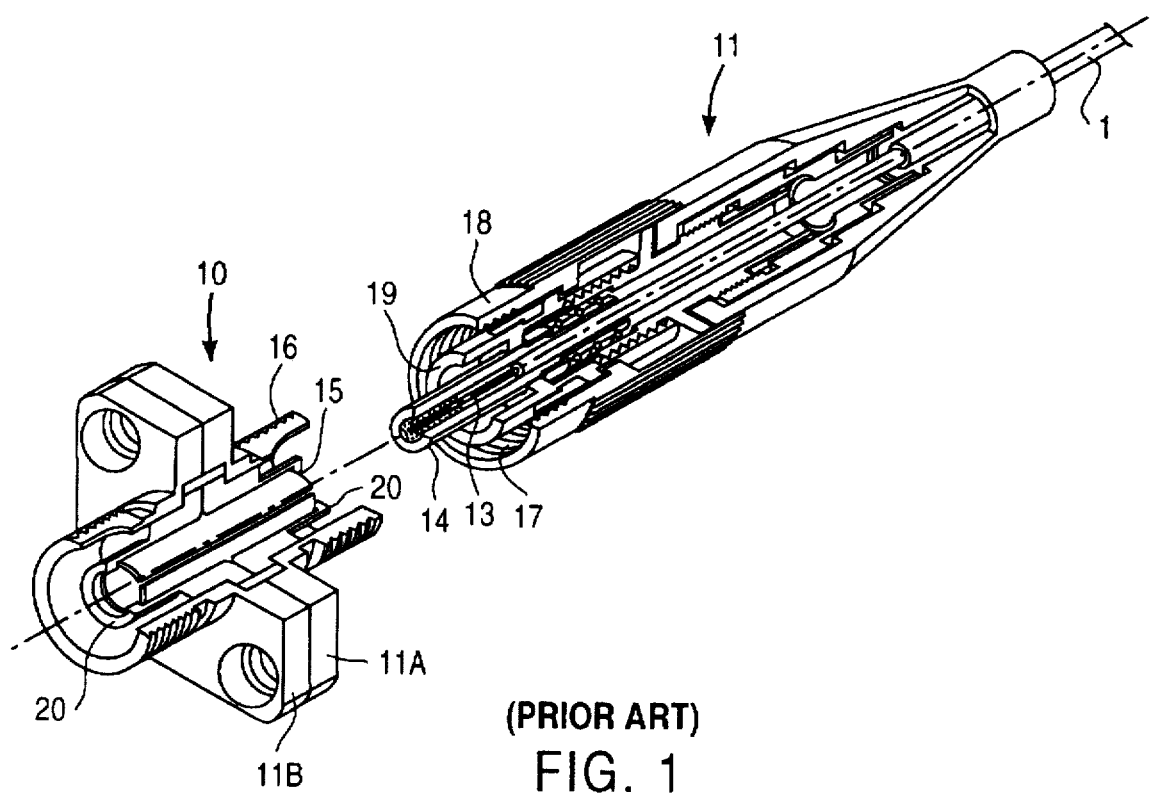
FIG. 1 illustrates a sectional view of a fiberoptic connector according to the prior art.

FIG. 1 is a cutaway view of an exemplary fiberoptic adapter 10 which receives a fiberoptic connector 11 for an optical fiber 13. As can be seen, the connector 11 is somewhat mechanically complex, but its purpose is straightforward. The connector 11 holds the optical fiber 13 which has its jacketed portion 12 extending away from the connector 11. The unjacketed portion and end of the fiber 13 is held in a ferrule 14 inside the central axis of a barrel fitting 19 and of the connector 11.

As shown, the adaptor 10 is really two adapters 10A and 10B mounted back-to-back so that a second fiberoptic connector can be received by the second adaptor 10B to connect two optical fibers together. When mated with the adaptor 10, the barrel fitting 19 of the connector 11 fits over a cylindrical fitting 20 of the adaptor 10. The cylindrical fitting 20 has a central opening along its axis and holds a C-shaped sleeve 15 which receives the ferrule 14. The connector 11 is held to the adapter 10 by the engagement of screw threads 17 inside a rotatable sleeve nut 18 which engages the outside threads 16 of a barrel 16 of the adapter 10. Typically the ferrule 14 and sleeve 15 are made from ceramic or metallized ceramic, while the other elements of the connector 11 and adaptor 10 are made from metal, such as stainless steel.

There are many types of different connectors and matching adapters and terminators. For example, some types are SC, MU, FC, ST (a registered trademark of AT&T), D4, MT/MTP and ESCON connectors. These various types specify the mechanical means by which the connector engages the adapter/terminator, but they also specify the end of the optical fiber of the connector/adaptor/terminator. For purposes of brevity, it should be noted that the term, "connector," as used below, refers to a fiberoptic connector, adaptor, or terminator.

Figure 2:
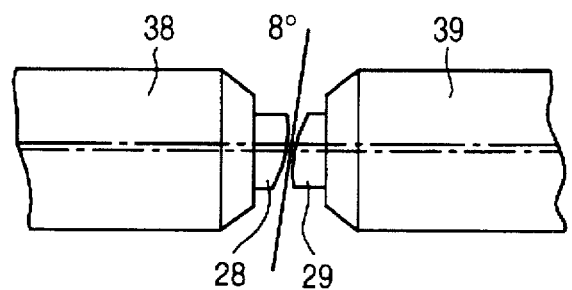
FIG. 2 is a detailed cross-sectional view of a mated fiberoptic connection for a particular type of fiberoptic connector and adaptor/terminator.

As an example, FIG. 2 illustrates the particular connection for an FC/APC (angled-physical contact fiber connector) type. Each connector has a sleeve 38 or 39 which each holds a ferrule 28 or 29. The ferrules 28 and 29 each hold the end section of an optical fiber. As shown, the end surface of each ferrule 28 and 29 and the end of its corresponding optical fiber is shaped into a reciprocal convex surface. The purpose is for minimum insertion loss, i.e., maximum transmission of optical signals between the two optical fibers, and conversely, low back reflection, i.e., low amount of reflected light by the connection.

Other types of connectors have other specified end surfaces for their optical fibers and the ferrule holding the fiber.

Figure 3A:
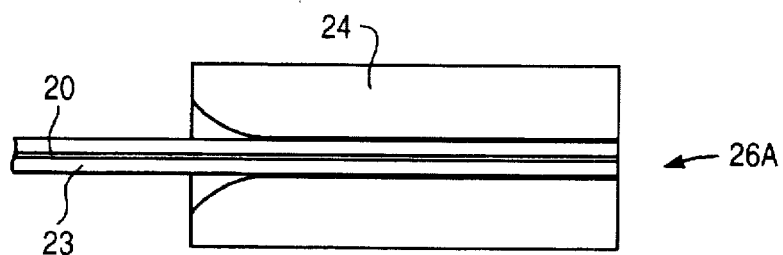
FIGS. 3A–3C are cross-sectional views of the ferrule and optical fiber for other types of fiberoptic connectors according to the prior art.
Figure 3B:
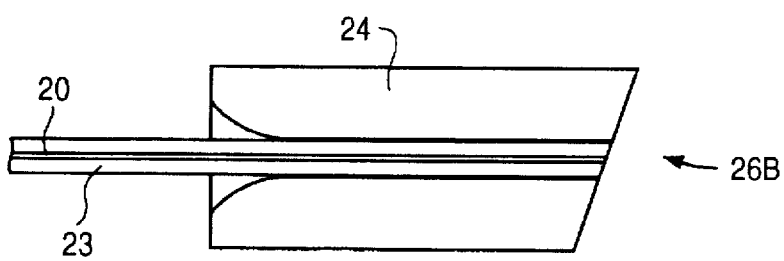
Figure 3C:
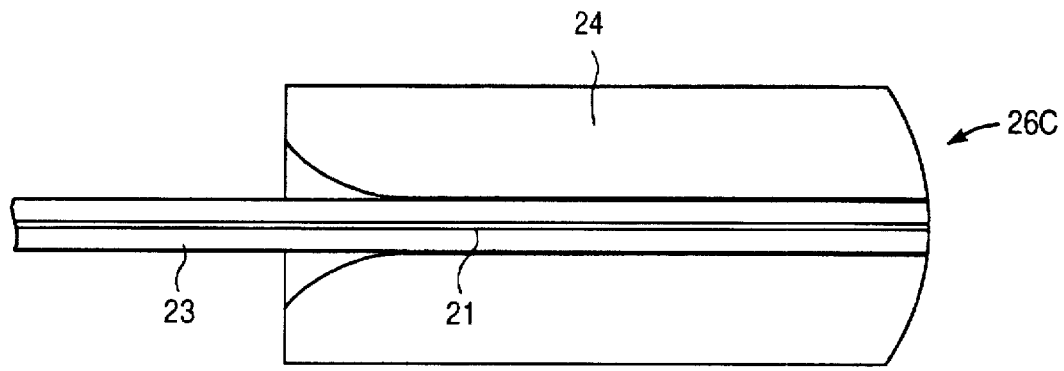

For example, FIG. 3A illustrates an optical fiber 23 with a core 21 which has its end section held by a ferrule 24. The end surface 26A of the ferrule 24 and the optical fiber 23 is prepared perpendicularly to the longitudinal axis of the ferrule 24 and optical fiber 23. At this point, it should be noted that the same reference numerals are used in different drawings for the same elements, or for elements performing the same functions to better explain the invention. In FIG. 3B, the end surface 26B of the ferrule 24 and the fiber 23 is prepared at an angle with respect to the surface perpendicular to the longitudinal axis. In FIG. 3C, the end surface of the ferrule 24 and optical fiber 23 is prepared as a convex surface 26C (but different from the FC/APC end surfaces illustrated in FIG. 2).

Figure 4A:
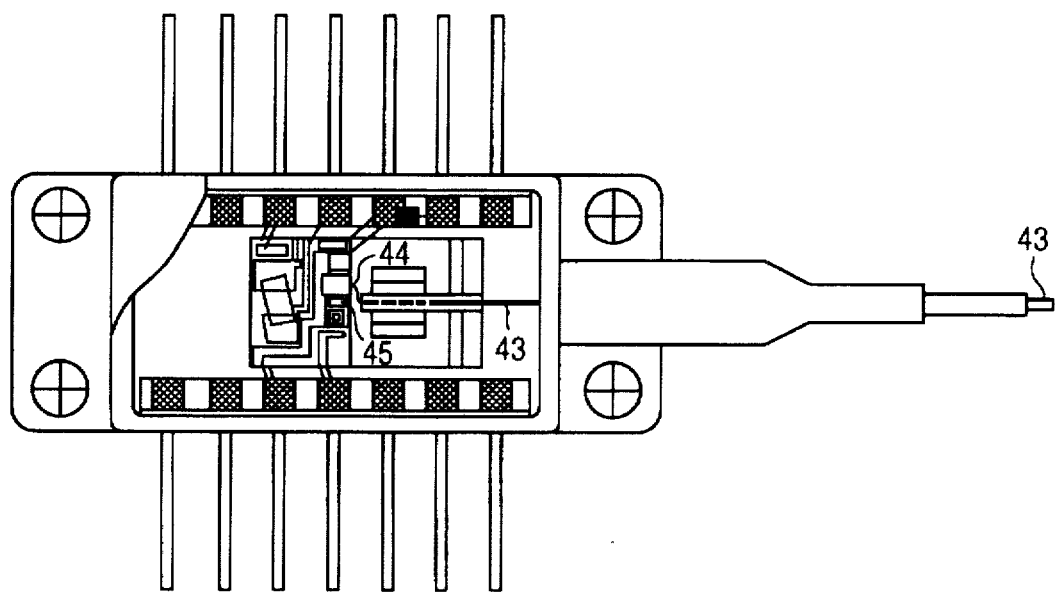
FIG. 4A is a cross-sectional top view of an exemplary laser diode package assembly which can benefit according to the present invention.
Figure 4B:
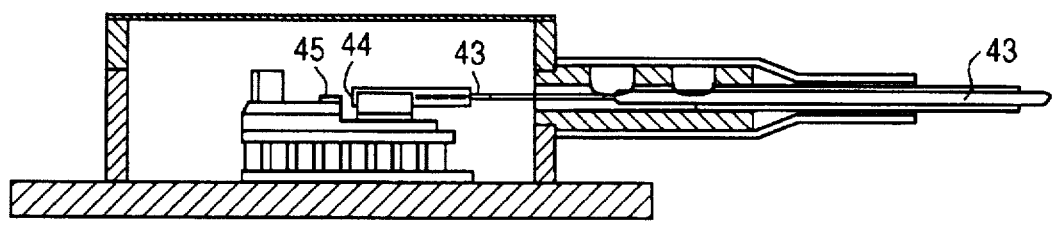
FIG. 4B is a cross-sectional side view of the FIG. 1A laser diode package assembly.

These fiberoptic connectors are installed at the ends of optical fibers which are connected to optical devices, such as laser diode assemblies, an example of which is illustrated in FIGS. 4A and 4B. The assembly has a laser diode chip 40 which generates light which is received by a lens 44 and focussed into one end of an output fiber 43. The particular details of the laser diode assembly are of no import here, except to note that the chip 40 has no optical isolators to protect the diode chip 40 from unwanted reflections. While many laser diode assemblies today include an internal optical isolator, some assemblies do not have optical isolators for reasons of costs or lack of space, for instance. However, without the protection of an optical isolator, the laser diode chip 40 in the assembly is extremely sensitive to any back reflections.

The opposite end of the output fiber 43 is terminated by a fiberoptic connector for connection to a fiberoptic adaptor so that the light of the laser diode assembly can be transmitted to other optical fibers of a fiberoptic network, for example. The particular fiberoptic connector is specified by the user. Present fiberoptic connectors have back reflection varying from −35 dB to less than −65 dB. While these numbers are excellent for most purposes, light reflections in the lower end of the range can cause the operation of the laser diode to be significantly affected adversely.

The present invention is an improvement for fiberoptic connectors so that the backward reflection of any connector can be significantly reduced. In accordance with the present invention, the construction of any fiberoptic connector remains the same, except for the following. Rather the end of an optical fiber terminating with the end surface of the ferrule, the end of the optical fiber is left inside the ferrule with a section of optical fiber forming the rest of the optical path from the optical fiber to the end of the ferrule.

Figure 5A:
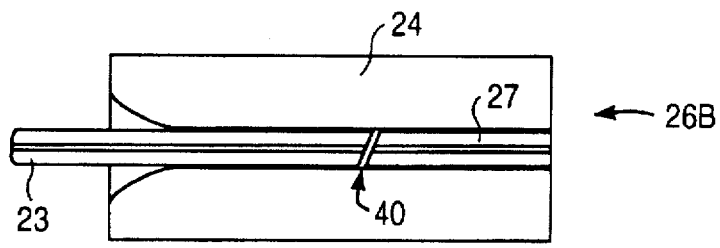
FIG. 5A is a cross-sectional view of the ferrule, optical fiber and optical fiber section according to the present invention.

FIG. 5A illustrates the general arrangement of the present invention. An exemplary optical fiber 23, say, the output fiber from a laser diode assembly, such as shown in FIGS. 4A and 4B, is terminated inside the ferrule 24. The end of the optical fiber 23 is formed at an angle θ with respect to a surface perpendicular to the longitudinal axis of the fiber. This angle can be equal to or less than 14° with respect to the perpendicular plane, as illustrated in a different arrangement by FIG. 5C. Such an end surface may be formed simply by cleaving the end of the fiber 23 at the angle θ or by angle-polishing the fiber by well-known techniques. The end surface of the fiber 23 is then coated with antireflection material.

An optical fiber section 27 is also inserted into the ferrule 24 between the end of the optical fiber 23 and the end of the ferrule 24. The end surface of the section 27 next to the fiber 23 is reciprocally angled with respect to the end surface of the fiber 23 and also covered by antireflection coating. The other end of the section 27 terminates with the end surface 28 of the ferrule 24. The end section 28 of the ferrule 24 and section 27 are then shaped as required for the particular type of fiberoptic connector required by the user.

Figure 5B:
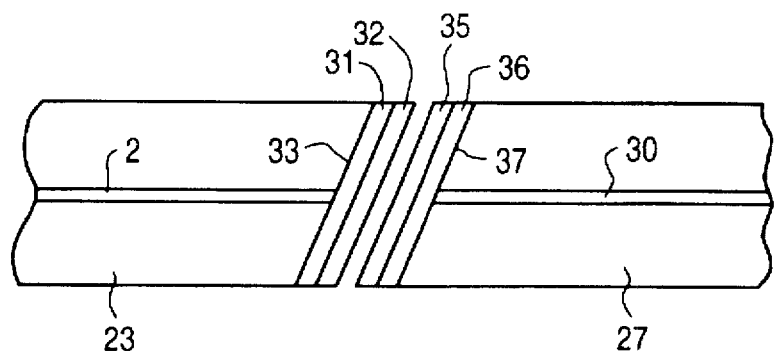
FIG. 5B is a detailed cross-sectional view of the optical fiber and optical fiber section.
Figure 5C:
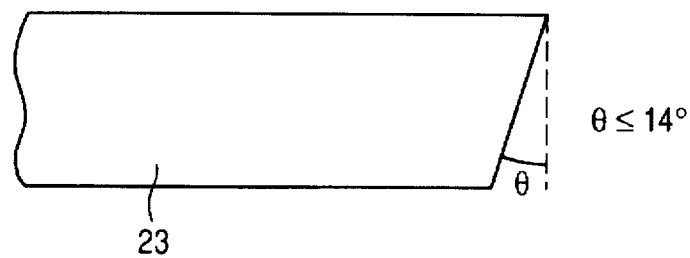
FIG. 5C is a cross-sectional view illustrating the angle of slant of the end surface of the optical fiber in FIGS. 5A and 5B.

FIG. 5B illustrates a detail of the end surface 33 of the fiber 23 and the end surface 37 of the fiber section 27. As mentioned above, the end surfaces 33 and 37 are reciprocally angled and are covered with antireflection material. As illustrated, the end surface 33 is covered by two layers of antireflection material 31 and 32, while the end surface 37 is covered by antireflection material layers 35 and 36. Antireflection materials, such as $SiO_2/ZrO_2$ and $SiO_2/TiO_2$, in total thicknesses in the range of 4100 Å to 6300 Å have been found to be suitable. For instance, for optical signals at a 1.55 μm wavelength, forming the layer 31(36) as 630 Å of $ZrO_2$ and layer 32(35) as 3500 Å of $SiO_2$ works quite effectively. Similarly, 3050 Å of $ZrO_2$ as layer 31(36) and 1820 Å of $SiO_2$ as layer 32(35) are also effective. The surfaces 33 and 37 are preferably separated by a spacing in the range of 1 μm to 200 μm.

The creation of another optical connection 40 in the sleeve 24 has minimal effect on the performance of the fiberoptic connector. It has been found that insertion loss due to this connection 40 is less than −0.1 dB. When connected to a laser source assembly, the amount of light intensity lost by this connection 40 is negligible. Furthermore, the back reflection is decreased to approximately −60 dB. This is far below the amount of light which would affect a laser diode operating at a nominal power of 0.5 watts.

Thus the present invention allows any fiberoptic connector to be created for an optical fiber. The creation of another type of connector and the addition of radically new elements are avoided. The use of existing fiberoptic connector technology keeps the costs of the present invention low. However, no matter what type of connector is specified, the present invention ensures that the back reflection is reduced to such low levels that optical devices, such as laser diodes, which are connected to the optical fiber, can operate without interference from the connector.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A fiberoptic connector for an optical fiber comprising an end section of said optical fiber;

a ferrule holding said end section such that an end of said optical fiber terminates in said ferrule;

an optical fiber section coaxially aligned along a longitudinal axis with said end section of said optical fiber in said ferrule between said end of said optical fiber and an end of said ferrule, said optical fiber section having first and second ends, said first end in close proximity to said end of said optical fiber, said second end terminating with said end of said ferrule, said end of said optical fiber and said first end of said optical fiber section each have end surfaces, each end surface reciprocally inclined to each other, each end surface having a normal to said end surface, said normal forming an angle with respect to said longitudinal axis; and a housing holding said ferrule.

2. The connector device of claim 1 wherein said angle is equal to or less than 14°.

3. The connector device of claim 2 wherein each end surface is coated with anti-reflection material.

4. The connector device of claim 1 wherein each end surface is coated with anti-reflection material.

5. A laser diode assembly comprising a laser diode chip;

a lens for focussing light from said laser diode chip;

an optical fiber having a first end receiving light focussed by said lens from said laser diode chip;

a first housing holding said laser diode chip, said lens, and said first end of said optical fiber in fixed relationship;

a fiberoptic connector holding a second end of said optical fiber, said connector having a ferrule holding said an end section of said optical fiber such that said second end of said optical fiber terminates in said ferrule;

an optical fiber section coaxially aligned along a longitudinal axis with said end section of said optical fiber in said ferrule between said second end of said optical fiber and an end of said ferrule, said optical fiber section having first and second ends, said first end in close proximity to said end of said optical fiber, said second end terminating with said end of said ferrule, said second end of said optical fiber and said first end of said optical fiber section each have end surfaces, each end surface reciprocally inclined to each other, each end surface having a normal to said end surface, said normal forming an angle with respect to said longitudinal axis; and a housing holding said ferrule.

6. The laser diode assembly of claim 5 wherein said angle is equal to or less than 14°.

7. The laser diode assembly of claim 6 wherein each end surface is coated with anti-reflection material.

8. The laser diode assembly of claim 5 wherein each end surface is coated with anti-reflection material.

* * * * *